(12) United States Patent
Nielsen et al.

(10) Patent No.: US 6,652,954 B2
(45) Date of Patent: Nov. 25, 2003

(54) RETROREFLECTIVE LAMINATE COMPRISING A TEAR RESISTANT FILM

(76) Inventors: Steven M. Nielsen, P.O. Box 33427, St. Paul, MN (US) 55133-3427; Raymond L. Lucking, P.O. Box 33427, St. Paul, MN (US) 55133-3427; John W. Frank, P.O. Box 33427, St. Paul, MN (US) 55133-3427; James E. Lasch, P.O. Box 33427, St. Paul, MN (US) 55133-3427; Gregg A. Patnode, P.O. Box 33427, St. Paul, MN (US) 55133-3427

( * ) Notice: Subject to any disclaimer, the term of this patent is extended or adjusted under 35 U.S.C. 154(b) by 0 days.

(21) Appl. No.: 09/870,225

(22) Filed: May 30, 2001

(65) Prior Publication Data

US 2002/0106486 A1 Aug. 8, 2002

Related U.S. Application Data

(63) Continuation-in-part of application No. 09/727,750, filed on Dec. 1, 2000, now abandoned.

(51) Int. Cl.⁷ .......................... B32B 27/36; G02B 5/12; G02B 5/122; G02B 5/128
(52) U.S. Cl. ................ 428/143; 428/156; 428/212; 428/325; 428/332; 428/404; 428/480; 428/914; 359/515; 359/529; 359/534; 359/538
(58) Field of Search ................... 359/515, 529, 359/534, 538; 428/143, 325, 156, 480, 404, 212, 406, 407, 332, 914

(56) References Cited

U.S. PATENT DOCUMENTS

| | | | | |
|---|---|---|---|---|
| 3,190,178 A | * | 6/1965 | McKenzie | 359/514 |
| 4,117,192 A | | 9/1978 | Jorgensen | 428/337 |
| 4,544,586 A | | 10/1985 | Molari, Jr. | 428/29 |
| 4,983,436 A | * | 1/1991 | Bailey et al. | 428/40.4 |
| 5,066,098 A | | 11/1991 | Kult et al. | 359/540 |
| 5,080,463 A | | 1/1992 | Faykish et al. | 359/536 |
| 5,422,189 A | | 6/1995 | Warner et al. | 428/480 |
| 5,427,842 A | * | 6/1995 | Bland et al. | 428/213 |
| 5,591,530 A | | 1/1997 | Warner et al. | 428/480 |
| 5,629,093 A | | 5/1997 | Bischof et al. | 428/411.1 |
| 5,905,099 A | | 5/1999 | Everaerts et al. | 522/126 |
| 6,004,422 A | | 12/1999 | Janovec et al. | 156/276 |
| 6,040,061 A | | 3/2000 | Bland et al. | 428/480 |
| 6,063,838 A | | 5/2000 | Patnode et al. | 523/172 |

FOREIGN PATENT DOCUMENTS

EP          795137 B1  *  9/1997

* cited by examiner

*Primary Examiner*—Ramsey Zacharia
(74) *Attorney, Agent, or Firm*—Carolyn A. Fischer

(57) ABSTRACT

The present invention relates to a laminate and an article comprising a retroreflective layer having a retroreflective viewing surface and an opposing surface and a tear resistant film disposed on the retroreflective layer. The finished article is preferably flexible and suitable for use as roll-up signs, flags, banners and other retroreflective articles requiring similar flexibility including other traffic warning and personal safety items.

22 Claims, 4 Drawing Sheets

RETROREFLECTIVE LAMINATE COMPRISING A TEAR RESISTANT FILM

This is a continuation-in-part of application Ser. No. 09/727,750 filed Dec.1, 2000 now abandoned.

FIELD OF THE INVENTION

The present invention relates to a laminate and an article such as roll-up sign, pavement marking tape and other retroreflective articles, comprising a retroreflective layer and a tear resistant film layer.

BACKGROUND OF THE INVENTION

U.S. Pat. Nos. 5,591,530 and 5,422,189 relate to a flexible optically uniform sign face substrate comprising at least one layer of durable thermoplastic sheeting and an optically uniform dimensionally stable scrim film, and more particularly a sign face substrate comprising at least one layer of optically uniform dimensionally stable multilayer scrim film laminated between at least two layers of durable thermoplastic sheeting for use in areas such as awning, canopy, fascia or sign material construction. The scrim film preferably comprises alternate layers of a stiff polyester or copolyester and a ductile thermoplastic polymeric material wherein the polyester or copolyester has a tensile modulus greater than 200 kpsi and the ductile material has a tensile modulus of less than 200 kpsi and a tensile elongation of greater than 50%. The sign face substrate is clear, transparent or translucent and does not show a visible pattern when backlit. In the "Background of the Invention" of these references, the scrim film is described as being advantageous with respect to polyester woven scrim construction that can introduce defects during the weaving process and final construction of the woven scrim, such as extraneous threads that are visibly apparent when the sign face is backlit. Further, woven scrim is also described as being susceptible to wicking, which can lead to growth of mold and mildew. The scrim film is also advantageous with regard to channel cut sign face construction prepared from rigid acrylics that are subject to cracking, shattering, and crazing. The sign faces are attached to a housing equipped with a lighting source to produce rigid backlit sign.

U.S. Pat. No. 4,544,586 relates to laminar structures useful as road sign, markers, informational signs and the like comprised of (i) a modified thermoplastic polyester core structure; and (ii) a front reflective layer disposed on and laminated to said core structure. At column 5, lines 52+this reference states that, "Preferably, the core structure A has a thickness in the range of from about 60 to about 250 mils. In general, if the thickness of the core A is less than about 60 mils, the laminar structures of the instant invention do not exhibit sufficient rigidity to perform satisfactorily as a road sign or marker or informational sign, and the like, particularly if it is relatively large, e.g. 12 inches by 18 inches and larger. If the core structure is less than about 60 mils thick, i.e., from about 30 to 60 mils thick, it is still possible to utilize laminar structures as road sign, markers, informational signs, and the like. In such instances it is preferred to use these laminar structures in conjunction with appropriate mounting or supporting devices. These mounting or support devices act to provide stiffening support to the laminar structure and impart the requisite rigidity. Some illustrative non-limiting examples of particularly useful mounting or support devices are disclosed in U.S. Pat. Nos. 3,894,707; 4,066,233; 4,094,487; 4,125,240 and 4,211,381." The mounting or support devices described therein are for securing an object, such as a sign, to a body, such as a post. The exemplified modified polyester sheet exhibits no permanent deformation (under the described conditions) in comparison to an aluminum sheet. Hence, one of ordinary skill in the art would conclude that the laminar is relatively stiff and rigid, comparable to that of aluminum sheeting used for sign substrate.

Typical constructions for pavement marking sheet materials are known from U.S. Pat. Nos. 4,117,192 and 4,299,874, for example. Such materials typically include a base sheet comprising elastomer precursors, i.e., ingredients that may be vulcanized or cured to form an elastomer. Retroreflective elements, such as glass microspheres in addition to skid-resisting particles are partially embedded in a support film on the surface of the base film. A pressure sensitive adhesive is typically present on the opposing surface the base sheet. The base sheet also typically comprises fibrous scrim.

Roll-up signs are known in the outdoor display and traffic control materials art. Such signs are portable and can be folded or rolled up for transport and storage. Typical constructions for roll-up signs are known from U.S. Pat. No. 6,004,422, for example. The article comprises a microstructured member such as highly flexible cube corner type retroreflective sheeting, a sealing layer, and a backing layer comprising a fibrous web (e.g. woven scrim) to provide the desired tear strength. During use, the signs are typically attached to a collapsible supporting apparatus to allow the sign to be displayed along a roadway. The roll-up signs typically include corner pockets that receive diagonally extending cross arms of a collapsible stand. Over time, roll-up signs can crack and tear, particularly along the circumference of an interface between a rigid corner pocket element and the flexible sign or where sewn pockets are formed.

SUMMARY OF THE INVENTION

The present Applicant has found that tear resistant films can be employed in roll-up signs, as well as other retroreflective laminates and articles. In a preferred embodiment, the tear resistant film is disposed on the retroreflective viewing surface of the laminate or article. Surprisingly, in doing so, the scrim as well as other layers such as the protective top film can be eliminated.

The present invention is a laminate comprising a retroreflective layer having a retroreflective viewing surface and a tear resistant film disposed on the retroreflective layer. The tear resistance film which has a nominal thickness of x in microns, preferably has a Graves area in at least one direction of at least about 40+0.4(x) kpsi % (275+2.76(x) MPa %). The Graves elongation at break is preferably at least 20%, and more preferably at least 40%. Further, the laminate exhibits a Graves area of at least 60 kg %. The tear resistant film preferably has a tensile modulus of at least 120 kpsi (828 MPa) in at least one direction. More preferably, the tensile modulus is at least 150 kpsi (1,035 MPa), even more preferably at least about 240 kpsi (1,656 MPa) and most preferably at least about 450 kpsi (3,105 MPa) in at least one direction.

The laminate is preferably substantially free of fibrous scrim. The tear resistant film and retroreflective layer are bonded directly to each other or bonded indirectly by means of one of more intermediate layers. The laminate preferably exhibits a 90 degree peel strength of at least 0.5 lb f/in (0.9 Newtons/cm).

In another embodiment, the present invention is a retroreflective article that is preferably flexible such that it can be wrapped by hand around a mandrel having a diameter of about ½" (1.3 cm) at 25° C. without cracking. Representative articles include roll-up signs, flags, banners, cone wrap sheeting, post wrap sheeting, barrel wrap sheeting, license plate sheeting, barricade sheeting, sign sheeting, vehicle marking sheeting, segmented vehicle marking sheeting, pavement marking tapes and sheeting; retroreflective tapes and decals; sew-on retroreflective articles, and the like.

In preferred embodiments the tear resistant film is transparent and is disposed on the retroreflective viewing surface of the laminate. The tear resistant film preferably comprises one or more light stabilizing compounds, one or more ultraviolet light absorbing compounds, and mixtures thereof.

In another embodiment the present invention is a laminate comprising a retroreflective layer and a tear resistant film disposed on the retroreflective layer; wherein the tear resistant film is a multilayer film. The multilayer film preferably comprises a surface comprising a thermoplastic polymeric material that is bonded directly to the retroreflective layer. The thermoplastic polymeric material preferably comprises co-polyethylene terephthalate. The multilayer tear resistant film preferably comprises alternate layers of a stiff polyester or copolyester and a ductile thermoplastic polymer wherein the polyester or copolyester has a tensile modulus greater than 200 kpsi (1380 MPa) and the ductile material has a tensile modulus of less than 200 kpsi and a tensile elongation of greater than 50%. For embodiments wherein a single multilayer film is employed, the multilayer film preferably comprises a total of more than five stiff and ductile layers situated one on the other in a parallel array, the stiff layer having an average nominal thickness of greater than about 1 micron.

The retroreflective laminate may further comprise at least one tie layer disposed between said retroreflective layer and said tear resistant film and/or at least one backing layer.

In another embodiment the present invention is a laminate comprising a retroreflective layer and a tear resistant film, wherein said laminate is substantially free of fibrous scrim and wherein the Graves area of the laminate is at least 150 kg %.

DETAILED DESCRIPTION OF THE DRAWINGS

Figure 1:
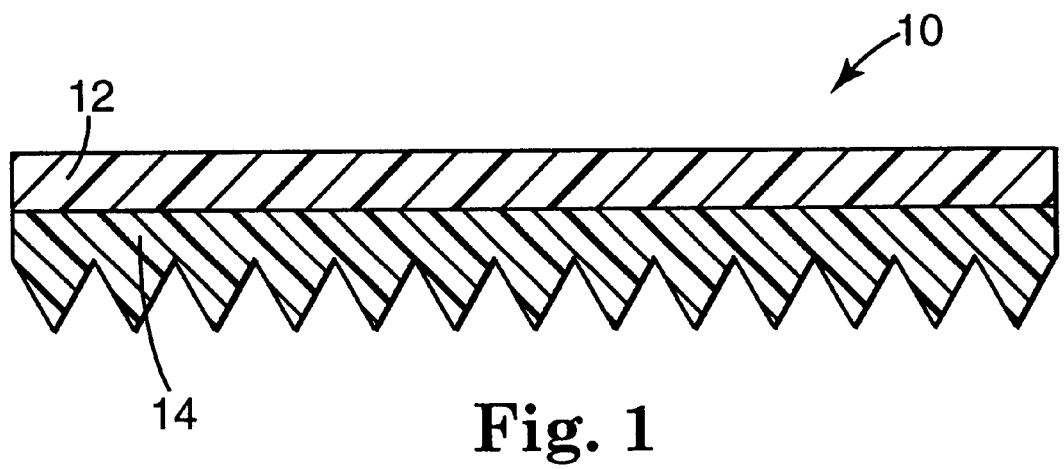
FIG. 1 to FIG. 5 are cross-sectional views of laminates and articles in accordance with the present invention, each having a retroreflective layer and a tear resistant film.

FIG. 1 depicts a retroreflective laminate 10 comprising a tear resistant film 12 bonded directly to the retroreflective viewing surface of cube corner-based retroreflective sheeting 14.

Figure 2:
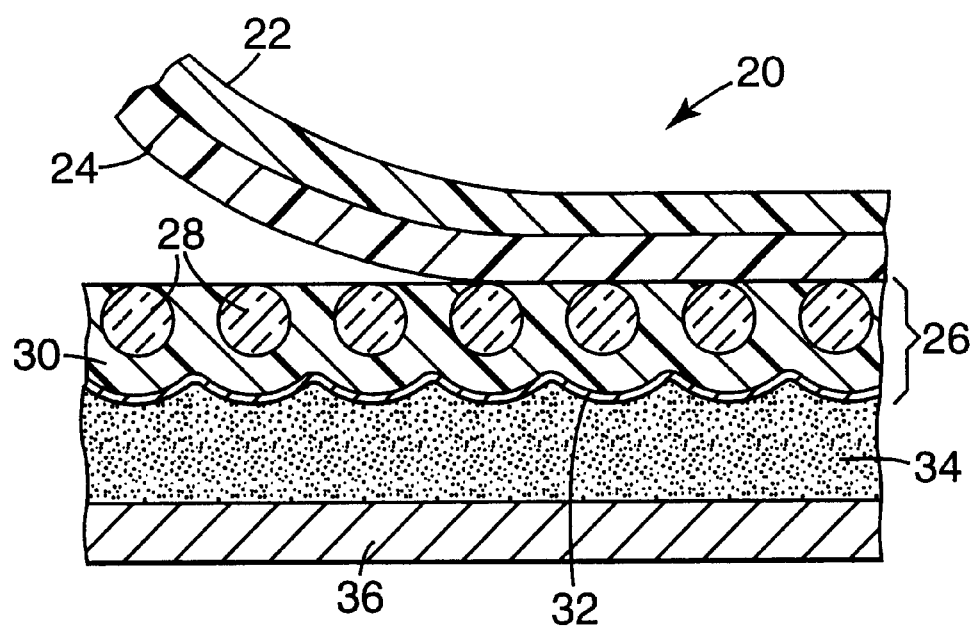

FIG. 2 depicts a retroreflective laminate 20 comprising a tear resistant film 22 bonded by means of an adhesive layer 24 to the retroreflective viewing surface of microsphere-based retroreflective sheeting 26 comprising a plurality of transparent microspheres 28 embedded in a binder 30, and a specular reflective layer 32. The opposing surface of the retroreflective sheeting contains a pressure sensitive adhesive layer 34 covered by a removable liner 36.

Figure 3:
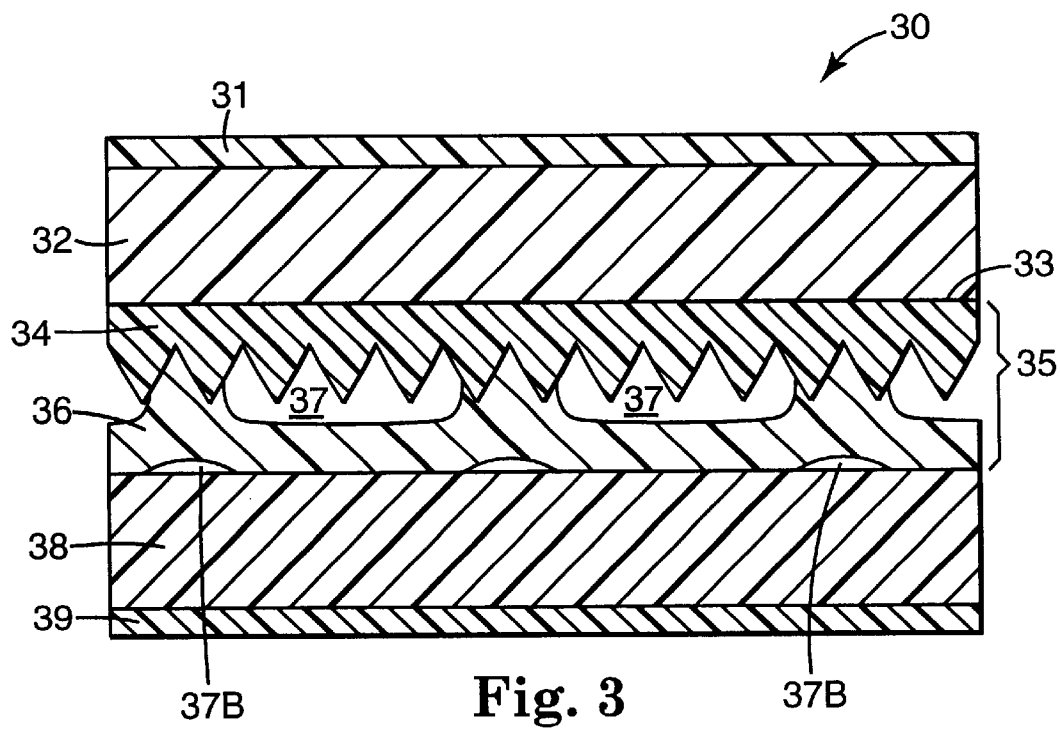

FIG. 3 depicts a cross-sectional view of a retroreflective laminate 30 suitable for use as a roll-up sign. The retroreflective viewing surface 33 of the retroreflective sheeting 35 comprises an ink-receptive coating 31 disposed on the exposed surface of the tear resistant film 32. The ink-receptive coating 31 of the tear resistant film 32 can subsequently be printed with an ink graphic. The retroreflective sheeting 35 comprises a white urethane seal film layer 36 and cells 37 that maintain an air interface between the seal film and the opposing surface of the cube corner sheeting 34. A white urethane backing film layer 38 disposed on the seal film and a gray pigmented coating 39 disposed on the backing film. The interface between the seal film 36 and the backing 38 may contain air voids 37B in the regions of the seal legs.

Figure 4:
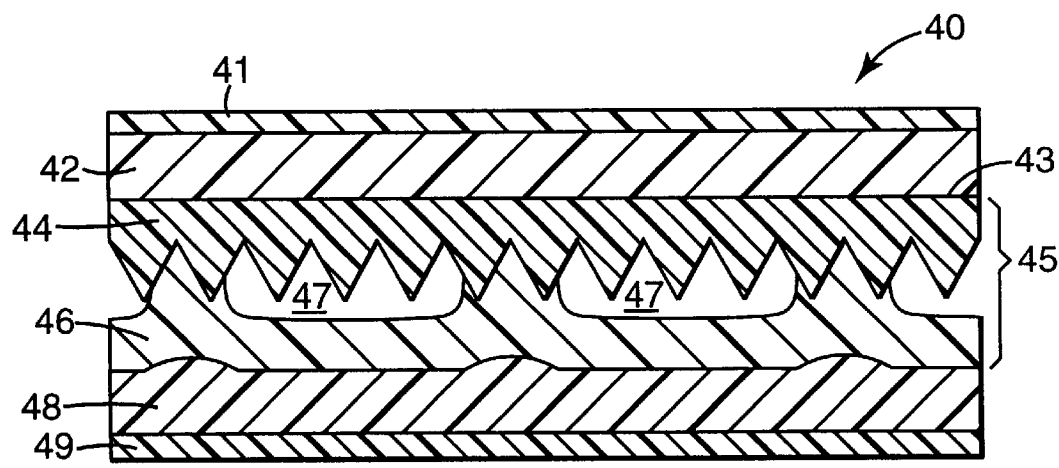

FIG. 4 depicts a cross-sectional view of another retroreflective laminate 40 suitable for use as a roll-up sign. In this embodiment, the tear resistant film 42 that is disposed on the retroreflective viewing surface 43 of the retroreflective sheeting 45 is approximately half the thickness of the tear resistant film depicted in FIGS. 1–3. A second tear resistant film 48, having approximately the same thickness as tear resistant film 42, is disposed upon the seal film 46 having cells 47 on the opposing surface of the sheeting, in place of the backing film 38 as depicted in FIG. 3. A gray pigmented coating 49 is disposed on the tear resistant film 48 for aesthetic reasons. The ink-receptive coating 41 is on the exposed surface of the tear resistant film 42. The surface of the tear resistant film 42 comprising the ink-receptive coating 41 can subsequently be printed with an ink graphic.

Figure 5:
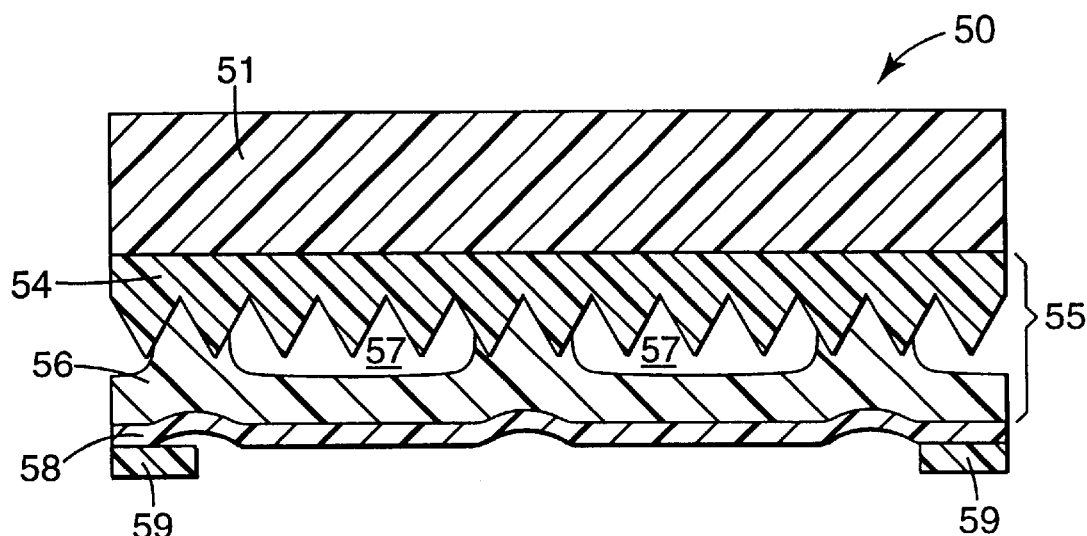

FIG. 5 depicts a cross-sectional view of another retroreflective laminate 50 suitable for use as a roll-up sign. The tear resistant film 51 comprises co-polyester on the opposing surface. The co-polyester surface of the tear resistant film is pre-printed with a reverse image of the desired graphic prior to bonding the tear resistant film to the retroreflective sheeting 55. In this embodiment, the backing film depicted in FIG. 3 is eliminated. The retroreflective sheeting comprises cube-corner film 54 and urethane seal film 56 having cells 57 coated with a gray pigmented coating 58. Corner pocket elements 59 are attached to each of the corners of the sign.

Figure 6:
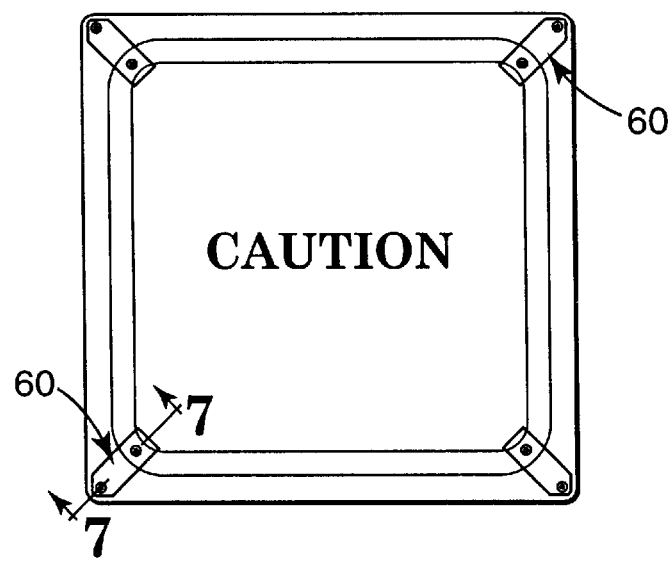
FIG. 6 is a plan view of a roll-up sign having corner pocket elements.

FIG. 6 depicts a plan view of a roll-up sign, having corner pocket elements 60 for subsequent attachment to a collapsible support.

Figure 7:
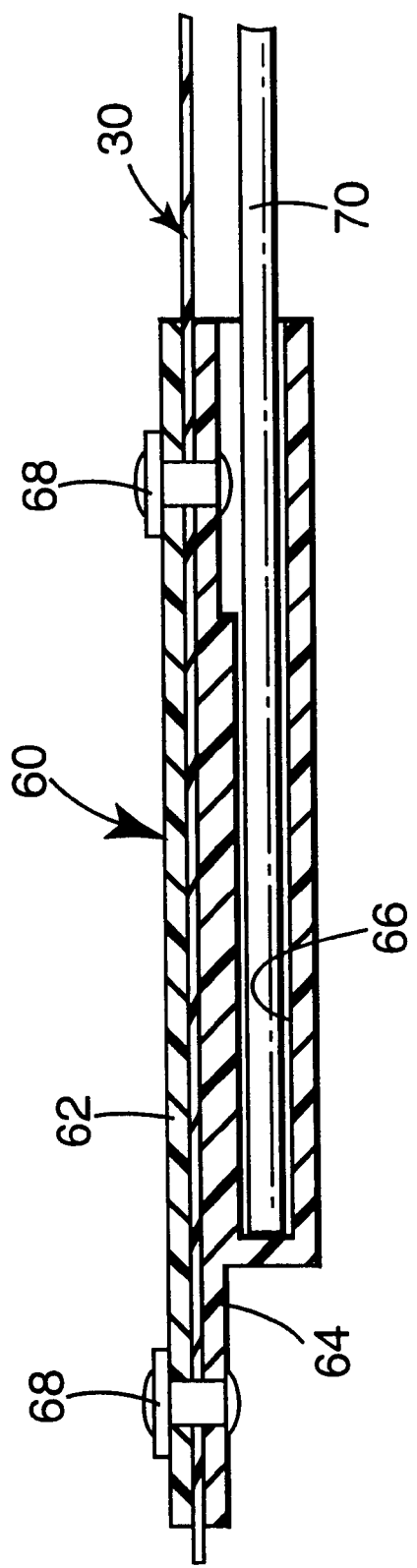
FIG. 7 is a cross-sectional view of a diagonal cross-section of the roll-up sign of FIG. 6.

FIG. 7 depicts a cross-sectional view along 7 of the corner pocket element 60 of the roll-up sign of FIG. 6. The retroreflective laminate 30 is mechanically attached to a corner pocket element 60 by means of two rivets 68. The retroreflective laminate 30 is sandwiched between the front piece 62 and a back piece 64 of the corner pocket element 60. The channel 66 of the corner pockets elements receives a rigid support 70.

DETAILED DESCRIPTION OF THE INVENTION

The present invention relates to a laminate and an article comprising a retroreflective layer having a retroreflective viewing surface and an opposing surface and a tear resistant film disposed on the retroreflective layer. As used herein "retroreflective viewing surface" refers to the surface of the retroreflective layer (e.g. retroreflective sheeting), laminate or article that is viewed by an observer. The retroreflective viewing surface of the laminate or article may be the retroreflective sheeting, the tear resistant film, as well as either of these layers further comprising other transparent layers or coatings disposed between the retroreflective surface of the sheeting and the observer.

The finished article is preferably flexible and suitable for use as roll-up signs, flags, banners and other retroreflective articles requiring similar flexibility including other traffic warning and personal safety items. As used herein "flexible", refers to the ability to wrap the laminate or article by hand around a mandrel having a diameter of about ½" (1.3 cm) at 25° C. without visible cracking. Preferably, the laminate or article is sufficiently flexible such that this test can be conducted a lower temperatures including 0° C. and −20° F. (−29° C.). More preferably, the laminate or article is sufficiently flexible such that it can be wrapped by hand around a mandrel having a diameter of about ¼" (6 mm) at each of these temperatures (25° C., 0° C. and −29° C.) without visible cracking.

The coefficient of retroreflection of the retroreflective layer varies depending on the desired properties of the finished article. In general, however, the retroreflective layer typically has a coefficient of retroreflection ranging from about 5 candelas per lux, for colored retroreflective layers, to about 1500 candelas per lux per square meter at 0.2 degree observation angle and −4 degree entrance angle, as measured according to ASTM E-810 test method for coefficient of retroreflection of retroreflective sheeting. For cube corner sheeting the coefficient of retroreflection is preferably at least about 200 candelas per lux for fluorescent orange and at least about 550 candelas per lux for white.

The retroreflective layer is commonly provided as retroreflective sheeting. The two most common types of retroreflective sheeting suitable for use are microsphere-based sheeting and cube corner-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). "Enclosed-lens" based sheeting refers to retroreflective sheeting in which the beads are in spaced relationship to the reflector but in full contact with resin. The "encapsulated lens" retroreflective sheeting is designed such that the reflector is in direct contact with the bead but the opposite side of the bead is in a gas interface. Illustrative examples of microsphere-based sheeting are disclosed in U.S. Pat. Nos. 4,025,159 (McGrath); 4,983,436 (Bailey); 5,064,272 (Bailey); 5,066,098 (Kult); 5,069,964 (Tolliver); and 5,262,225 (Wilson).

Cube corner sheeting, sometimes referred to as prismatic, microprismatic, or triple mirror reflector sheetings, typically includes a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. The light rays are typically reflected at the lateral faces due to total internal reflection, or by reflective coatings, as previously described, on the back side of the lateral faces. Preferred polymers for cube corner sheeting include poly (carbonate), poly(methylmethacrylate), poly (ethyleneterephthalate), aliphatic polyurethanes, as well as ethylene copolymers and ionomers thereof. Cube corner sheeting may be prepared by casting directly onto a film, such as described in U.S. Pat. No. 5,691,846 (Benson) incorporated herein by reference. Preferred polymers for radiation cured cube corners include cross linked acrylates such as multifunctional acrylates or epoxies and acrylated urethanes blended with mono-and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

In embodiments wherein the sheeting is likely to be exposed to moisture, the cube corner retroreflective elements are preferably encapsulated with a seal film. In instances wherein cube corner sheeting is employed as the retroreflective layer, a backing layer may be present for the purpose of opacifying the laminate or article, improving the scratch and gouge resistance thereof, and/or eliminating the blocking tendencies of the seal film. Illustrative examples of cube corner-based retroreflective sheeting are disclosed in U.S. Pat. Nos. 5,138,488 (Szczech); 5,387,458 (Pavelka); 5,450,235 (Smith); 5,605,761 (Burns); 5,614,286 (Bacon) and 5,691,846 (Benson, Jr.).

In the laminate and article of the present invention, a tear resistant film is disposed on at least one surface of the retroreflective layer. The retroreflective layer may be bonded directly to the tear resistant film or indirectly, by means of one or more intermediate layers such as tie layers, sealing layers, prime layers, etc. The tear resistant film is preferably disposed on the retroreflective viewing surface of the laminate or article. Alternatively, however, the tear resistant film may be disposed on the opposing surface as well as on both surfaces of the retroreflective layer.

"Tear resistant" film refers to a single film or two or more film layers that exhibits a Graves area (as measured by ASTM D 1004) in at least one direction of the film equal to at least about 40+0.4(x) kpsi % (276+2.76(x)MPa %) wherein x is the nominal thickness of the film in microns (i.e. micrometers). Graves area is a combined measure of the film's tensile modulus (i.e., the film's stiffness and dimensional stability) and the ability of the film to resist advancing a tear. Consequently, Graves area may be regarded as a measure of the total energy required to cause the film to fail; that is, the ability of the film to absorb energy. The tear resistant film typically has a nominal thickness of from about 7 to 500 microns, preferably from about 15 to 185 microns, and more preferably from about 25 microns (~1 mil) to about 125 microns (~5 mils). The tear resistant film preferably demonstrates a tensile modulus (as measured by ASTM D 822-88) of at least about 120 kpsi (828 Mpa), preferably of at least about 150 kpsi (1035 MPa), more preferably of at least about 175 kpsi (1,208 MPa), even more preferably of at least about 240 kpsi (1,656 MPa), and most preferably of at least about 450 kpsi (3,105 MPa) in at least one direction of the film. Preferably, the tear resistant film exhibits a Graves elongation at break of at least 20%, and more preferably at least 40% during the Graves area test.

Typically, the tear resistance of the laminate or article is provided primarily by a single tear resistant film. In other embodiments, however, two or more film layers are provided such that the laminate or article exhibits the desired strength. The laminate or article of the present invention is comparable in tear resistance to a comparative laminate comprising fibrous scrim and topfilm. Further, the laminate or article of the present invention advantageously improves the Graves tear by at least 20%, preferably by at least 40% and more preferably by at least 60% in comparison to a comparative laminate comprising a retroreflective layer and a non-tear resistant topfilm that is substantially free of fibrous scrim. The Graves tear of the laminate is at least about 60 kg %. The laminate typically exhibits a Graves tear of at least about 80 kg % and more typically of at least about 100 kg % for lower tear strength laminates. For articles requiring higher tear resistance, the Graves tear is preferably at least about 150 kg %, more preferably at least about 200 kg %, even more preferably at least about 250 kg %, and most preferably about 300 kg % or greater; comparable to similar laminate comprising fibrous scrim.

For preferred embodiments, wherein the tear resistant film is disposed on the retroreflective viewing surface of the retroreflective layer, it is important that the tear resistant film is sufficiently transparent such that the laminate provides the intended coefficient of retroreflectivity. An uncolored tear resistant film preferably is able to transmit at least 50 percent of visible light incident upon the film. More preferably, the film has a light transmissibility of greater than about 70 percent, even more preferably greater than about 80 percent and most preferably greater that about 90 percent at these wavelengths. Conversely, the tear resistant film has a haze value, as measured according to ASTM D1003 of less than 50%, preferably less than about 30%, more preferably less than about 20%, even more preferably less than about 10%, and most preferably less than about 5%. For embodiments wherein a tear resistant film is disposed on the opposing surface, the tear resistant film may be translucent or opaque.

Further, for longevity of the laminate and article, it is preferred that the tear resistant film maintains its transparency and physical properties (e.g. tensile and Graves tear) for an extended duration of time under exposure to the environment. For this reason and/or to protect the underlying retroreflective layer, it is preferred that the tear resistant film comprises one or more ultraviolet light absorbing compounds and/or one or more light stabilizing compounds. Representative light stabilizing compounds include various hindered amine compounds. Ultraviolet light absorbing compounds include tris-aryl triazine compounds, benzotriazole and dimerized benzotriazole compounds; benzophenone and dimerized benzophenone compounds; benzoxazinone compounds, cyanoacrylate compounds as well as amide functional compounds and compounds described in U.S. Pat. No. 5,994,431 (Olson), incorporated herein by reference.

The tear resistant film is preferably a multilayer film comprising alternating layers of coextruded polymeric thermoplastics. The total number of individual layers, the exact order of the individual layers, as well as the composition of each layer may vary. The individual layers of the multilayer film construction typically have an average nominal thickness of at least about 0.1 microns, more preferably from 0.2 microns to 75 microns and, most preferably, from about 0.2 to 25 microns. The multilayer film comprises at least 2 layers, typically at least 3 layers, preferably at least 4 layers, more preferably at least 5, even more preferably from greater than 5 layers to 35 layers, and most preferably 13 layers.

In the present invention, the tear resistant film is preferably selected or manufactured such that at least one film surface comprises a thermoplastic polymeric material that will bond sufficiently to the retroreflective sheeting. Sufficient bond strength is characterized by a 90 degree peel strength of at least 0.5 lbf/in (0.9 Newton/cm), more preferably at least about 1 lbf/in (1.8 Newtons/cm), and more preferably at least about 2 lbf/in (3.6 Newtons/cm). The 90 degree peel strength can be evaluated by attaching a 1 inch by 8 inch piece of the retroreflective sheeting side of the laminate to an 0.06 inch thick, rigid aluminum panel by means of a double sided adhesive tape, (for example SCOTCH BRAND 410 TAPE), starting a separation of the tear resistant film portion from the retroreflective sheeting portion along the line of weakness there between, clamping the rigid aluminum panel into a sliding platform on a testing machine with the tear resistant film facing and clamped into a gripping mechanism, and causing the testing machine to peel the tear resistant film portion from the retroreflective sheeting portion at 300 millimeters per minute while the sliding platform freely moves to maintain a peel angle of 90 degrees, and recording the average force. During testing, bond failure is initiated at the interface between the tear resistant film portion and the retroreflective sheeting. However, the locus of failure may change, favoring the path of least resistance. For example, the tear resistant film may fail within at the interface between the high modulus and ductile layers or may progress to a failure combining tearing and or separation of the various layers. Regardless of the failure locus or failure mode, high peel forces indicate the retroreflective article is less likely to come apart under handling. Having such a thermoplastic polymeric material on the tear resistant film surface reduces or eliminates the necessity of tie layers, between the tear resistant film and other laminar to which the tear resistant film is to be bonded, particularly polycarbonate cube corner sheeting. The thermoplastic polymeric material preferably melts or softens at a temperature less than that of the retroreflective layer. For instances wherein the tear resistance film and retroreflective sheeting are premanufactured, the thermoplastic polymeric material preferably can be thermally bonded to the retroreflective surface at a temperature ranging from about 350° F. (177° C.) to about 450° F. (232° C.).

A preferred multilayer tear resistant film is described in U.S. Pat. Nos. 5,591,530, 5,422,189 and 5,427,842, incorporated herein by reference. The multilayer film described therein preferably comprises alternate layers of a stiff polyester or copolyester and a ductile thermoplastic polymeric material. Stiff polyesters and copolyesters useful in the tear resistant film are typically high tensile modulus materials, preferably materials having a tensile modulus, at the temperature of interest, greater than 200 kpsi (1,380 MPa), and most preferably greater than 400 kpsi (2,760 MPa). Preferred stiff polyesters and copolyesters for use as the stiff material in the tear resistant film include polyethylene terephthalate, polyethylene naphthalate, polybutylene terephthalate, polybutylene naphthalate, and blends thereof. Additional stiff copolyesters based on these materials may be provided by copolymerizing these ingredients with one or more other diacids and/or one or more other diols and/or triols.

Ductile materials useful in the tear resistant film generally have a tensile modulus of less than 200 kpsi (1,380 MPa) and a tensile elongation (defined below), at the temperature of interest, of greater than 50%, preferably greater than 150%. The ductile polymer may be selected from, for example, ethylene copolymers, polyesters, copolyesters, polyolefins, polyamides and polyurethanes. However, a preferred ductile polymer is a copolyester comprising the reaction product of terephthalic acid and sebacic acid at a ratio of about 3:2 with ethylene glycol.

Beneficial improvements in the tear resistance of films comprising alternating layers of stiff and ductile materials are typically realized when the ductile material provides less than 5 weight % of the film. Ductile material amounts of at least about 1 weight % (preferably at least about 2.6 weight %), up to about 10 to 25 weight % of the film may be useful.

In instances wherein a single multilayer tear resistance film is employed, the multilayer film preferably comprises 5 or more stiff layers alternated with 5 or more ductile layers. In instances wherein multiple film layers are employed, such as the retroreflective laminate of FIG. 4, it is preferred that each film layer has the corresponding thickness and film layers such that the laminate or article exhibits the desired tear resistance. For example, with regard to FIG. 4, since two tear resistant film layers are employed, each layer preferably has 2–3 stiff layers alternated with 2–3 ductile layers. Further, the preferred film thickness is typically half that of a preferred single multilayer tear resistance film.

Tear resistant films may optionally include a layer of an intermediate material disposed between otherwise adjacent layers of the stiff and ductile polymers. Useful intermediate materials may be selected from a wide variety of polymers and, in some cases, may be selected to enhance the adhesion between the otherwise adjacent stiff and ductile layers. One or more functional layers may also be applied to one or both of the major surfaces of the film.

Some other tear resistant films are commercially available from ShatterGard under the trade designation "Shatter-Gard"; Permagard Storm and Security Protection, Carolina Beach, N.C., under the trade designation "Perma-Gard" and available from Glass Sentinel Products Inc., Altamonte Springs, Fla. Such films are surmised to be prepared by adhesively bonding thin individual thermoplastic film layers (e.g. stiff polyester or copolyester) to form a multilayer film. Other tear resistant films include polyethylene based films commercially available from Illinois Tool Works Inc., Glenview, Ill. under the trade designation "Valeron" and films available from Inteplast Group LTD, Livingston, N.J. under the trade designation "Inteplast". In order to be suitable for use on the retroreflective viewing surface of the laminate or article, the thermoplastic film layer(s) and adhesive(s) shall be chosen such that the multilayer film will exhibit the desired transparency, as previously described.

Colorants (e.g. pigments and/or dyes), ultraviolet light absorbers, light stabilizers, free radical scavengers, antioxidants, processing aids such as antiblocking agents, releasing agents, slip agents, lubricants, and other additives may be added to the retroreflective layer, tear resistant film, or both.

The articles of the invention may further comprise "color layers" comprising a daylight fluorescent dye dissolved in a polymeric matrix. The polymeric matrix is preferably substantially transparent to visible light, particularly to light of the wavelengths emitted by the dye and light of the wavelengths which cause the dye to fluoresce. The polymeric matrix is typically the base polymer of the tear resistant film or one or more layers of the multilayer tear resistant film.

The fluorescent dye, which is a daylight fluorescent dye, i.e., one which emits visible light upon exposure to light of a visible wavelength is typically selected based on the desired color, solubility with the polymeric matrix and stability in the polymeric matrix. For polyester or copolyester polymeric matrixes, preferred dyes include thioxanthene dye, commercially available from Clariant Corp, Coventry, R.I., under the trade designation "C.I. Solvent Yellow 98", also known as "Hostasol Yellow 3G"; thioindigoid dye, commerically available from Clariant Corp, Coventry, R.I., under the trade designation "C.I. Vat Red 41", also known as "Hostasol Red SB"; napthalamide dye, commercially available from Keystone Aniline Corp, Chicago, Ill., under the trade designation "C.I. Solvent Yellow 43", also known as "Keyplast FL Yellow R"; benzoxazole coumarin dye, commercially available from Bayer AG, Leverkusen, Germany, under the trade designation "C.I. Solvent Yellow 160: 1", also known as "Fl Yellow 10GN"; perylene imide dye, commercially available from BASF Aktiengesellschaft, Ludwigshafen, Germany, under the trade designation "Lumogen F Orange 240"; perylene dye, commercially available from Keystone Aniline Corp, Chicago, Ill., under the trade designation "C.I. Solvent Green 5", also known as "Keyplast FL Yel-Gre 7G"; isovaleranthrone dye, commercially available from Keystone Aniline Corp, Chicago, Ill., under the trade designation "C.I. Pigment Violet 31", also known as "Keyplast FL Violet FFR"; as well as combinations of such dyes. Among these, perylene imide and thioxanthene dyes are preferred for their good weatherability and good fluorescence.

Typically, the color layer contains between about 0.01 and about 3.0, and preferably between about 0.05 and about 1.0, weight percent of dye. Color layers that contain lower amounts of dye may not exhibit the degree of bright fluorescence which is desired. Color layers which contain high levels of fluorescent dye may exhibit self-quenching phenomena. In some instances, the dye in the color layer will preferably consist essentially of thioxanthene, thioindigoid, isovaleranthrone, a napthalamide, benzoxazole coumarin, perylene, and/or perylene imide dyes. In other instances, however, the color layer may also contain coloring agents such as pigments or other dyes in addition to those described above to adjust the color and appearance of the article. If desired, non-fluorescent dyes or pigments may also be used, however, such dyes should be selected so as to not undesirably interfere with the fluorescent performance of the daylight fluorescent dyes discussed above or with the overall appearance of the article. In the case of retroreflective articles, any non-fluorescent dyes or pigments used should not undesirably impair the transparency of the color layer.

By incorporating a fluorescent dye into the tear resistant film, and in particular by incorporating a fluorescent dye into one or unexposed layers of the tear resistant film, retroreflective articles can be provided that exhibit an enhancement in fluorescent durability. The fluorescent properties of the articles are retained for extended lengths of time, even upon prolonged exposure to direct sunlight, comprising electromagnetic radiation having wavelengths within the range of about 290 nanometers up through visible light range.

Preferred fluorescent articles of the invention comprise a color layer having first and second surface and a screen layer disposed on the first surface of said color layer. The color layer comprises a fluorescent dye dissolved in a polymeric matrix. The screen layer is substantially transparent to visible light and comprises a means for screening substantial portions of ultraviolet radiation which is incident thereto. The color layer and screen layer may be separate layers arranged in the defined manner or may be laminated together, either directly or with an intermediate adhesive layer. Preferably, the tear resistant film comprises both the color layer and screen layer.

The retroreflective layer and tear resistant film may be preconstructed and bonded by any suitable bonding technique such as melt bonding, (e.g. high frequency welding and/or thermal welding) ultrasonic bonding, radio frequency bonding and adhesive bonding. Alternatively, the retroreflective layer and/or tear resistant film may be formed and bonded in-line. For example, in a preferred embodiment, radiation cured cube corners may be cast directly onto a tear resistant film comprising a fluorescent dye.

For ease in manufacturing, the tear resistant film typically covers an entire surface of the retroreflective sheeting. Alternatively, however, the tear resistant film may be bonded or disposed in such a manner that a portion of the retroreflective sheeting is not bonded (directly or indirectly) to the tear resistant film. For example the tear resistant film may be employed as a reinforcement patch on the back surface of a roll-up sign beneath each of the corner pocket elements. Further, the corner pocket elements can be constructed from or comprise the tear resistant film. Alternatively, the tear resistant film may be employed as a reinforcement frame having a width of approximately 20 cm along the perimeter of the laminate, with or without strips of the tear resistant film spanning diagonally from each corner. In another embodiment, the tear resistant film may be present in a lattice design.

Regardless of the method of bonding the retroreflective layer to the tear resistant film layer, the bond strength between these two layers is typically characterized by a 90 degree peel of at least 0.5 lbf/in (0.9 Newton/cm), more preferably at least about 1 lbf/in (1.8 Newtons/cm), and more preferably at least about 2 lbf/in (3.5 Newtons), as previously described.

In some instances, however, particularly in the case of polycarbonate cube film, the retroreflective layer may not form a bond of sufficient strength directly with certain tear resistant films such as those comprising a stiff polyester or copolyester film surface. In such instances, the construction of the tear resistant film can be modified, as previously described. For example, the alternation of the stiff and ductile layers of the preferred multilayer tear resistant film can be adapted such that at least one surface of the tear resistant film comprises a ductile thermoplastic material. Co-polyethylene terephthalate ("CoPET") has been found to be a particularly preferred thermoplastic material for use as the outer layer of the tear resistant film. "Co-polyethylene terephthalate" refers to a copolymer of 80% terephthalic acid and 20% isophthalic acid reacted with ethylene glycol.

Alternatively, one or more tie layers (e.g. adhesive) can be employed to improve the adhesion of the retroreflective layer to the tear resistant film. Such layers may also contribute other properties to the laminate or article such as a barrier to the migration of monomeric plasticizers. The tie layer is typically a thermoplastic polymer having a lower melting point in relation to the chosen polymer used in the retroreflective layer. The tie layer may be a single polymer, a single phase or multiphase blend of polymers, or may include multiple layers of compatible polymers to accomplish the bonding of the retroreflective layer to the tear resistant film. Exemplary polymers suitable for use as the tie layer include polyurethane; alkylene/alkyl acrylate copolymers such as ethylene methyl acrylate copolymer, ethylene N-butyl acrylate copolymer, ethylene ethyl acrylate copolymer; ethylene vinyl acetate copolymer; ethylene acrylic acid copolymer, polymerically plasticized polyvinyl chloride (PVC); and polyurethane primed ethylene acrylic acid copolymer as well as acrylate-based pressure sensitive adhesives. Blends of such materials may also be used if desired.

The laminate may optionally (and typically, in the case of signage) further comprise at least one ink receptive layer or coating ranging in thickness from about 100 angstroms to about 0.5 mils (120,000 angstoms). The layer or coating is typically applied to the tear resistant film on the retroreflective viewing surface of the laminate. Alternatively, in the case of reverse image preprinted laminates and articles, the ink receptive layer or coating may be applied to the opposing face of the tear resistant film which is preprinted prior to attaching the tear resistant film to the retroreflective layer. This advantageously eliminates the need for a protective overlay or topfilm. The ink receptive layer may further comprise a slip agent. In preferred embodiments, the surface of the tear resistant film comprises a thermoplastic polymeric material that can be bonded directly to the retroreflective layer in addition to being receptive to ink (e.g. vinyl). The previously described CoPET as well as acrylics such a polymethyl methacrylate (PMMA) and copolymers thereof, are representative examples of materials that can advantageously serve this dual purpose.

The laminate or article of the present invention advantageously does not necessitate the presence of an additional reinforcing layer to obtain the desired tear strength. Although fibrous (e.g. woven and/or nonwoven) scrims as well as additional scrim films can also be incorporated, the present invention advantageously provides laminates and articles that are substantially free of fibrous scrim.

In the case of wrap products, tape, decals, license plate sheeting, barricade sheeting and sign sheeting for example, a pressure sensitive adhesive is typically applied to the opposing surface of the laminate in order to secure the laminate or article to a barrel, cone, post, roadway, license plate, barricade, or sign surface. In other applications the laminate may be adhered or sewn onto clothing, shoes, etc.

The laminate is suitable for use as roll-up signs, flags, banners and other retroreflective articles requiring similar flexibility including other traffic warning items such as rollup sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as retroreflective tapes and decals. The laminate is also useful in a wide variety of retroreflective safety devices including articles of clothing, construction work zone vests, life jackets, rainwear, logos, patches, promotional items, luggage, briefcases, book bags, backpacks, rafts, canes, umbrellas, animal collars, truck markings, trailer covers and curtains, etc.

EXAMPLES

Objects and advantages of this invention are further illustrated by the following examples, but the particular materials and amounts thereof recited in these examples, as well as other conditions and details, should not be construed to unduly limit this invention. All parts, percentages, and ratios herein are by weight unless otherwise specified.

Test Methods

1. "Graves Area" was measured according to ASTM D1004. The reported value was the average of at least ten samples, at least five samples in machine direction and at least five samples in transverse direction.
2. "Haze" was measured according to ASTM D1003.
3. "Tensile Modulus" and "Tensile Elongation" were measured according to ASTM D882.
4. "Flexibility" was evaluated by draping a sample, having a width of about 1 cm by a length of 10 cm, around a ½ inch (1.3 cm) diameter cylindrical mandrel at 25° C. If the ends of the sample, after being wound lengthwise around the mandrel, could be pinched together without the laminate cracking, the sample was rated "Pass" and considered to be flexible.

5. "Cold Flexibility" was evaluated by repeating the flexibility test after conditioning the sample and a ¼" mandrel at −20° F. (−29° C.) for 3 hours.

Tear Resistant Films Used in the Examples

The five tear resistant films used in the Examples along with certain film properties are set forth in TABLE I. "% UVA" was the amount in weight percent of ultraviolet light absorber ("UVA") present in the polyethylene terephthalate ("PET") portion of the film. A tris-aryl-triazine UVA was employed. Tear resistant films 1–4 were prepared as described in U.S. Pat. No. 6,040,061, whereas tear resistant film 5 is "Valeron", as previously described.

TABLE I

| Tear Resistant Film # | UVA (%) | Film Thickness (Microns) | Graves Area (kg %) | Haze (%) | Tensile Modulus (MPa) | Tensile Elongation at Break (%) |
| --- | --- | --- | --- | --- | --- | --- |
| 1 | 3 | 109 | 184 | 1.0 | 6,479 | 65 |
| 2 | 2 | 97 | 151 | 0.9 | 6,479 | 66 |
| 3 | 1 | 84 | 126 | 1.1 | 6,465 | 70 |
| 4 | 2 | 71 | 122 | 0.6 | 6,603 | 65 |
| 5 |   | 165 | 750 |   | 1100 | 220%+ |

Comparative Examples A–B

Examples 1–13

The laminate of Comparative Example A represents a laminate suitable for use as a roll-up sign comprising fibrous scrim. The laminate was prepared as described in Example 9 of U.S. Pat. No. 6,004,422, with the following exceptions: 1) The sealing layer was prepared by twin screw compounding exterior pigment grade titanium dioxide ("$TiO_2$") commercially available from Dupont, Wilmington Del. under the trade description "Ti-Pure R960" with aliphatic polyester polyurethane commercially available from Huntsman Polyurethanes, West Deptford, N.J. under the trade designation "PNO3.214" and pelletized to produce 45 weight % $TiO_2$ concentrate pellets. The pellets were dry blended with PNO3.214 and extruded to produce a 60 micron thick film containing 15 weight % $TiO_2$. 2) The backing layer was prepared as described above for the sealing layer except that the film was 113 microns thick.

The laminate of Comparative Example B was prepared as described for Comparative Example A, except that no fibrous scrim and no backing layer were used.

The laminate of Example 1 was prepared as described for Comparative Example A, except that no fibrous scrim was used and the aliphatic urethane overlay layer of the laminate described in U.S. Pat. No. 6,004,422 under the heading "EXAMPLE" was replaced with a 109 micron thick multilayer tear resistant film. The multilayer tear resistant film, film no. 1 of Table I, was prepared as described in Example 6 of U.S. Pat. No. 6,040,061 with the following exceptions: 1) 3% of tris-aryl triazine UVA was added to the polyester resin at the extruder. 2) 6 layers of PET were alternated with 6 layers of a copolyester consisting of 60% terephthalic acid and 40% sebacic acid reacted with ethylene glycol. The total copolyester weight was 5% of the total weight of the PET layers. 3) One face of the film comprised a 20 micron thick layer of a copolymer that consisted of 80% terephthalic acid and 20% isophthalic acid reacted with ethylene glycol. 4) The resultant tear resistant film was oriented sequentially 3.3 times in machine direction (MD), 3.4 times in transverse direction (TD) and heat set at 232° C. Tear resistant film nos. 2–4 were prepared in the same manner as tear resistant film no. 1 with the exception that the thickness of the 6 layers of PET and the 6 layers of a copolyester were proportionately reduced to arrive at the film thickness set forth in Table I.

The laminate of Example 2 was prepared as described for Example 1, except that the urethane backing layer was 60 microns thick.

The laminate of Example 3 was prepared as described for Example 1, except that no backing layer was used.

The laminate of Example 4 was prepared as described for Example 1, except that that the multilayer tear resistant film was 97 microns thick and 2% UVA was used in the PET layers of the tear resistant film.

The laminate of Example 5 was prepared as described for Example 4, except that a 60 micron thick urethane backing layer was used.

The laminate of Example 6 was prepared as described for Example 4, except that no backing layer was used.

The laminate of Example 7 was prepared as described for Example 1, except that the multilayer tear resistant film was 84 microns thick and 1% UVA was used in the PET layers of the tear resistant film.

The laminate of Example 8 was prepared as described for Example 7, except that a 60 micron thick urethane backing layer was used.

The laminate of Example 9 was prepared as described for Example 7, except that no backing layer was used.

The laminate of Example 10 was prepared as described for Example 1, except that the multilayer tear resistant film was 71 microns thick and 2% UVA was used in the PET layers of the film.

The laminate of Example 11 was prepared as described for Example 10, except that the urethane backing layer was 60 microns thick.

The laminate of Example 12 was prepared as described for Example 10, except that no backing layer was used.

The laminate of Example 13 was prepared as described for Example 12 except 165 micron thick "Valeron" was laminated to the sealing film with an adhesive commercially available from Minnesota Mining and Manufacturing Company, St. Paul, Minn. ("3M") under the trade designation "3M Brand 941 Laminating Adhesive".

Comparative Example A represent a laminate suitable for use as a roll-up sign comprising fibrous scrim.

The laminates of Comparative Examples A–B and Examples 1–13 are set out in TABLE II.

The test results of Examples 1, 4, 7, and 10 in comparison to Comparative Example A depicted in Table II demonstrate that the laminates of the invention exhibit a comparable Graves area to laminates comprising fibrous scrim and overlay film. Examples 3, 6, 9, and 12 in comparison to Comparative Example B demonstrate that even in the absence of backing, the tear resistant film contributes a substantial improvement in Graves area in comparison to polyurethane overlay.

TABLE II

| Example No. | Tear Resistant Film # | Urethane Backing Layer (Microns) | Fibrous Scrim (Yes or No) | Flexibility (Yes or No) | Graves Area (kg %) |
|---|---|---|---|---|---|
| Comp. Ex. A | — | 113 | Yes | Pass | 360 |
| Comp. Ex. B | — | None | No | Pass | 39 |
| 1 | 1 | 113 | No | Pass | 443 |
| 2 | 1 | 60 | No | Pass | 340 |
| 3 | 1 | None | No | Pass | 124 |
| 4 | 2 | 113 | No | Pass | 434 |
| 5 | 2 | 60 | No | Pass | 293 |
| 6 | 2 | None | No | Pass | 91 |
| 7 | 3 | 113 | No | Pass | 425 |
| 8 | 3 | 60 | No | Pass | 286 |
| 9 | 3 | None | No | Pass | 83 |
| 10 | 4 | 113 | No | Pass | 473 |
| 11 | 4 | 60 | No | Pass | 286 |
| 12 | 4 | None | No | Pass | 79 |
| 13 | 4 | None | No | Pass | 778 |

Examples 1–2, 4–5 and 7–8 and 13 were also tested with the previously described Cold Flexibility test and were found to pass the test.

Example 14

Example 14 sets forth a laminate in accordance with the invention comprising microsphere-based retroreflective sheeting and is suitable for use as a license plate sheeting, barricade sheeting or sign sheeting. The laminate of FIG. 2 employed a tear resistant film prepared as described previously in Example 4 of Table I with the exception that the film thickness was 97 microns. The tear resistant film was laminated to the retroreflective viewing side of reflective sheeting commercially available from 3M under the trade designation "3M Scotchlite Reflective License Plate Sheeting Series 3750 (White)" with an adhesive commercially available from Minnesota Mining and Manufacturing Company, St. Paul, Minn. ("3M") under the trade designation "3M Brand 941 Laminating Adhesive". The tear resistant film and retroreflective sheeting were laminated with the adhesive using a laminator commercially available from 3M under the trade designation "Scotchlite Applicator HSRA 36" set to 3.6 MPa.

Comparative Example C

Example 15

The laminate of Comparative Example C was a pavement marking tape with an embedded fibrous scrim commercially available from 3M under the trade designation "3M Scotch-Lane Removable Tape Series 651".

The laminate of Example 15 was prepared by laminating, using a hot can set at 115° C., a 50 micron thick vinyl film to the Tear Resistant Film #4. The vinyl film was that described at column 5, lines 5–23 of U.S. Pat. No. 4,117,192 (Jorgensen) with scattered glass microspheres averaging about 0.4 mm in diameter partially embedded in the vinyl film. A 178 micron thick adhesive prepared according to Example 61 of U.S. Pat. No. 6,063,838 was then laminated between a laminating nip with a pressure of 138 kPa to the CoPET side of Tear Resistant Film #4 of the vinyl film/Film #4 laminate.

The physical properties of the laminates of Comparative Example C and Example 14 were measured and are set out in TABLE III. The properties in TABLE III were measured according to ASTM D882, except that the rate was 2.54 cm/minute and the testing equipment was an Instron Tensile Tester (Model 1122), with an upgrade package commercially available from MTS Systems Corp., Cary, N.C. under the trade designation "MTS ReNew". The results in Table III are the average of four measurements.

The data in TABLE III show that the laminate of the invention had superior yield and break properties when compared to a commercially available pavement marking tape product that utilized a fibrous scrim for reinforcement. The laminate of the present invention is further advantageous since both the fibrous scrim in addition to the rubber layer were replaced by a single layer of tear resistant film, reducing the number of manufacturing steps.

TABLE III

| Example No. | Yield Load (N) | Yield Strain (%) | Break Load (N) | Break Strain (%) |
|---|---|---|---|---|
| Comparative Ex. C | 176 | 3.3 | 253 | 20.8 |
| 15 | 206 | 5.6 | 341 | 119 |

What is claimed is:

1. A laminate comprising a retroreflective layer having a retroreflective viewing surface and a tear resistant film disposed on the retroreflective viewing surface of the retroreflective layer; wherein the retroreflective layer comprises sheeting selected from cube corner-based sheeting and microsphere-based sheeting, the microsphere-based sheeting comprising a multitude of microspheres at least partially embedded in a binder layer and associated specular or diffuse reflecting material; and wherein the tear resistant film is a single film having a nominal thickness of x in microns and a Graves area in at least one direction of at least about 40+0.4(x) kpsi%.

2. The laminate of claim 1 wherein the tear resistant film has tensile modulus of at least 120 kpsi (828 MPa).

3. The laminate of claim 2 wherein the tear resistant film has Graves elongation at break of at least 20%.

4. The laminate of claim 1 wherein the laminate is substantially free of fibrous scrim.

5. The laminate of claim 1 wherein the retroreflective layer and tear resistant film are bonded directly to each other or bonded by means of an intermediate layer, having a minimum 90 degree peel strength of at least 0.5 lbf/in (0.9 Newtons/cm).

6. The laminate of claim 5 wherein the tear resistant film comprises a light stabilizing compound, ultraviolet light absorbing compound, and mixtures thereof.

7. A retroreflective article comprising the laminate of claim 1; wherein the article can be wrapped by hand around a mandrel having a diameter of about ½ inch (1.3 cm) at 250° C. without cracking.

8. The retroreflective article of claim 7 wherein said article is selected from the group of roll-up signs, flags, banners, roll-up sheeting, cone wrap sheeting, post wrap sheeting, barrel wrap sheeting, license plate sheeting, barricade sheeting, sign sheeting vehicle marking sheeting, segmented vehicle marking sheeting, pavement marking tape, pavement marking sheeting, tape, decal and sew-on retroreflective articles.

9. The laminate of claim 1 wherein the tear resistant film is transparent.

10. The laminate of claim 9 wherein the tear resistant film has Graves elongation at break of at least 40%.

11. The laminate of claim 1 wherein the tear resistant film is provided as at least two film layers, the laminate having a Graves area of at least 60 kg%.

12. The laminate of claim 1 wherein the tear resistant film has a tensile modulus of at least 150 kpsi (1,035 MPa) in at least one direction.

13. The laminate of claim 1 wherein the tear resistant film has a tensile modulus of at least 240 kpsi (1,656 MPa) in at least one direction.

14. The laminate of claim 1 wherein the tear resistant film has tensile modulus of at least 450 kpsi (3,105 MPa) in at least one direction.

15. The laminate of claim 1 wherein the tear resistant film is a multilayer film.

16. The laminate of claim 15 wherein the multilayer film comprises at least one surface comprising a thermoplastic polymeric material layer that is bonded directly to the retroreflective viewing surface of the retroreflective layer.

17. The laminate of claim 16 wherein the thermoplastic polymeric material layer comprises co-polyethylene terephthalate.

18. The laminate of claim 15 wherein the multilayer tear resistant film comprises alternate layers of a stiff polyester or copolyester and a ductile thermoplastic polymer wherein the polyester or copolyester has a tensile modulus greater than 200 kpsi (138 MPa) and the ductile material has a tensile modulus of less than 200 kpsi and a tensile elongation of greater than 50%.

19. The laminate of claim 15 wherein the multilayer film comprises a total of more than five stiff and ductile layers situated one on the other in a parallel array, the stiff layer having an average nominal thickness of greater than about 1 micron.

20. The laminate of claim 1 further comprising at least one tie layer disposed between said retroreflective layer and said tear resistant film.

21. The laminate of claim 1 further comprising at least one backing layer.

22. A laminate comprising a retroreflective layer having a retroreflective viewing surface and a tear resistant film disposed on the retroreflective viewing surface of the retroreflective layer, wherein the retroreflective layer comprises sheeting selected from cube corner-based sheeting and microsphere-based sheeting, the microsphere-based sheeting comprising a multitude of microspheres at least partially embedded in a binder layer and associated specular or diffuse reflecting material; and wherein said lamina is substantially free of fibrous scrim and wherein the Graves area of the laminate is at least 150 kg%.

* * * * *

UNITED STATES PATENT AND TRADEMARK OFFICE
CERTIFICATE OF CORRECTION

PATENT NO.    : 6,652,954 B2
DATED         : November 25, 2003
INVENTOR(S)   : Nielsen, Steven M.

It is certified that error appears in the above-identified patent and that said Letters Patent is hereby corrected as shown below:

Column 18,
Line 21, "lamina" following "said" should be -- laminate --.

Signed and Sealed this

Fourth Day of May, 2004

JON W. DUDAS
*Acting Director of the United States Patent and Trademark Office*